US009900628B2

(12) United States Patent
Swan et al.

(10) Patent No.: US 9,900,628 B2
(45) Date of Patent: Feb. 20, 2018

(54) MEDIA CONTENT REDIRECTION

(71) Applicant: Comcast Cable Communications, LLC, Philadelphia, PA (US)

(72) Inventors: Mark Swan, Chester Springs, PA (US); Weidong Mao, West Windsor, NJ (US); Sree Kotay, Philadelphia, PA (US); Mark Vickers, Belmont, CA (US); Mohsin Roowalla, Richmond, CA (US); Chris Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/449,380

(22) Filed: Mar. 3, 2017

(65) Prior Publication Data
US 2017/0339435 A1    Nov. 23, 2017

Related U.S. Application Data

(63) Continuation of application No. 13/542,187, filed on Jul. 5, 2012, now abandoned.

(51) Int. Cl.
| H04N 7/16 | (2011.01) |
| H04N 21/2343 | (2011.01) |
| H04N 21/4788 | (2011.01) |
| H04N 21/41 | (2011.01) |
| H04N 21/472 | (2011.01) |
| H04N 21/482 | (2011.01) |

(52) U.S. Cl.
CPC ..... *H04N 21/2343* (2013.01); *H04N 21/4126* (2013.01); *H04N 21/4788* (2013.01); *H04N 21/47217* (2013.01); *H04N 21/4821* (2013.01)

(58) Field of Classification Search
CPC .......... H04N 21/2343; H04N 21/4788; H04N 21/4821; H04N 21/47217; H04N 21/4126
USPC ............................................................. 725/5
See application file for complete search history.

(56) References Cited

U.S. PATENT DOCUMENTS

| 5,991,799 A * | 11/1999 | Yen .................... G06F 17/30867 |
| | | 707/E17.109 |
| 7,299,275 B2 * | 11/2007 | Tsukidate ........... H04N 7/17354 |
| | | 348/E7.075 |
| 7,337,392 B2 | 2/2008 | Lue |
| 7,344,084 B2 | 3/2008 | DaCosta |
| 7,369,749 B2 * | 5/2008 | Ichioka ................ G11B 27/036 |
| | | 348/E5.097 |
| 7,506,355 B2 | 3/2009 | Ludvig et al. |
| | (Continued) | |

OTHER PUBLICATIONS

Overview of the DLNA Architecture, Spring 2008.
(Continued)

*Primary Examiner* — Michael B Pierorazio
(74) *Attorney, Agent, or Firm* — Banner & Witcoff, Ltd.

(57) ABSTRACT

A first device may request that multimedia content be made available on a second device. The first device may send the request to a server. The server mat notify the second device of the multimedia content. Based on how quickly the server receives a request, from the second device, for the content, the server mat determine how to ingest the multimedia content from a content source. The server mat ingest the multimedia content in full or in part prior to sending the multimedia content to the second device.

20 Claims, 8 Drawing Sheets

(56) References Cited

U.S. PATENT DOCUMENTS

| | | | |
|---|---|---|---|
| 7,603,683 B2* | 10/2009 | Reto | H04L 29/06027 709/204 |
| 7,653,921 B2* | 1/2010 | Herley | H04N 7/16 382/100 |
| 7,703,116 B1* | 4/2010 | Moreau | G06F 3/0482 725/44 |
| 7,712,125 B2* | 5/2010 | Herigstad | H04N 7/163 725/109 |
| 7,721,315 B2 | 5/2010 | Brown et al. | |
| 7,734,579 B2* | 6/2010 | White | H04N 5/76 707/609 |
| 7,849,207 B2 | 12/2010 | Kazmi et al. | |
| 7,873,974 B2 | 1/2011 | DaCosta | |
| 7,908,625 B2* | 3/2011 | Robertson | H04L 12/2838 348/552 |
| 8,145,779 B2 | 3/2012 | Zhang | |
| 8,307,395 B2* | 11/2012 | Issa | G06F 17/30817 709/219 |
| 8,776,145 B2* | 7/2014 | Hyde | H04N 21/2146 725/74 |
| 8,839,295 B2* | 9/2014 | Kim | H04N 21/26283 725/40 |
| 8,966,530 B2* | 2/2015 | Sinha | H04N 21/47202 725/40 |
| 9,756,349 B2* | 9/2017 | Perlman | H04N 19/188 |
| 2003/0061206 A1* | 3/2003 | Qian | G06F 17/30035 |
| 2003/0063217 A1* | 4/2003 | Smith | H04N 7/088 348/460 |
| 2004/0103426 A1* | 5/2004 | Ludvig | H04H 20/86 725/9 |
| 2004/0148571 A1* | 7/2004 | Lue | G06F 17/30905 715/239 |
| 2004/0215718 A1* | 10/2004 | Kazmi | H04L 65/4084 709/203 |
| 2005/0144455 A1* | 6/2005 | Haitsma | G06F 17/30743 713/176 |
| 2005/0262542 A1* | 11/2005 | DeWeese | H04L 12/1818 725/106 |
| 2006/0031883 A1* | 2/2006 | Ellis | H04N 7/163 725/58 |
| 2006/0031889 A1* | 2/2006 | Bennett | H04L 29/06027 725/80 |
| 2006/0190966 A1* | 8/2006 | McKissick | G06Q 30/02 725/61 |
| 2007/0124756 A1* | 5/2007 | Covell | G06F 17/30743 725/18 |
| 2007/0157281 A1* | 7/2007 | Ellis | H04N 7/17309 725/134 |
| 2008/0027953 A1* | 1/2008 | Morita | G11B 27/11 |
| 2008/0059532 A1* | 3/2008 | Kazmi | G06F 21/10 |
| 2008/0060036 A1* | 3/2008 | Cox | G06F 17/30017 725/110 |
| 2008/0109477 A1 | 5/2008 | Lue | |
| 2008/0127289 A1 | 5/2008 | Julia et al. | |
| 2008/0133701 A1 | 6/2008 | Kazmi et al. | |
| 2008/0155626 A1 | 6/2008 | Matsumoto et al. | |
| 2008/0215170 A1* | 9/2008 | Milbrandt | G06F 17/30749 700/94 |
| 2008/0235733 A1* | 9/2008 | Heie | H04N 7/163 725/46 |
| 2009/0037954 A1* | 2/2009 | Nagano | H04H 60/72 725/39 |
| 2009/0037961 A1 | 2/2009 | Green et al. | |
| 2009/0119708 A1* | 5/2009 | Harrar | G06F 8/38 725/39 |
| 2009/0158326 A1 | 6/2009 | Hunt et al. | |
| 2009/0228920 A1 | 9/2009 | Tom et al. | |
| 2009/0320058 A1* | 12/2009 | Wehmeyer | H04N 7/17336 725/31 |
| 2009/0320072 A1* | 12/2009 | McClanahan | H04N 5/44543 725/47 |
| 2009/0320073 A1* | 12/2009 | Reisman | G06F 17/30873 725/51 |
| 2010/0121936 A1* | 5/2010 | Liu | H04N 5/44543 709/217 |
| 2010/0131385 A1* | 5/2010 | Harrang | G06Q 30/00 705/26.1 |
| 2010/0251292 A1* | 9/2010 | Srinivasan | H04H 20/57 725/37 |
| 2010/0269146 A1 | 10/2010 | Britt | |
| 2010/0296487 A1* | 11/2010 | Karaoguz | H04W 84/045 370/332 |
| 2010/0303440 A1 | 12/2010 | Lin et al. | |
| 2010/0313233 A1 | 12/2010 | Ruffini et al. | |
| 2011/0004910 A1 | 1/2011 | Eyer | |
| 2011/0066744 A1* | 3/2011 | Del Sordo | H04N 21/235 709/231 |
| 2011/0068899 A1* | 3/2011 | Ioffe | G05B 15/02 340/8.1 |
| 2011/0086619 A1* | 4/2011 | George | H04M 1/72533 455/414.1 |
| 2011/0138064 A1* | 6/2011 | Rieger | G06F 17/30905 709/228 |
| 2011/0191439 A1* | 8/2011 | Dazzi | G06F 15/16 709/217 |
| 2011/0191446 A1* | 8/2011 | Dazzi | G06F 15/16 709/219 |
| 2012/0110619 A1 | 5/2012 | Kilar et al. | |
| 2012/0117590 A1* | 5/2012 | Agnihotri | H04N 21/25816 725/30 |
| 2012/0260299 A1 | 10/2012 | Kotecha et al. | |
| 2012/0278725 A1* | 11/2012 | Gordon | H04N 21/2665 715/738 |
| 2012/0291079 A1* | 11/2012 | Gordon | H04N 21/2665 725/109 |

OTHER PUBLICATIONS list. Dictionary.com. Dictionary.com Unabridged. Random House, Inc. http://dictionary.reference.com/browse/list (accessed: Aug. 20, 2015).

* cited by examiner

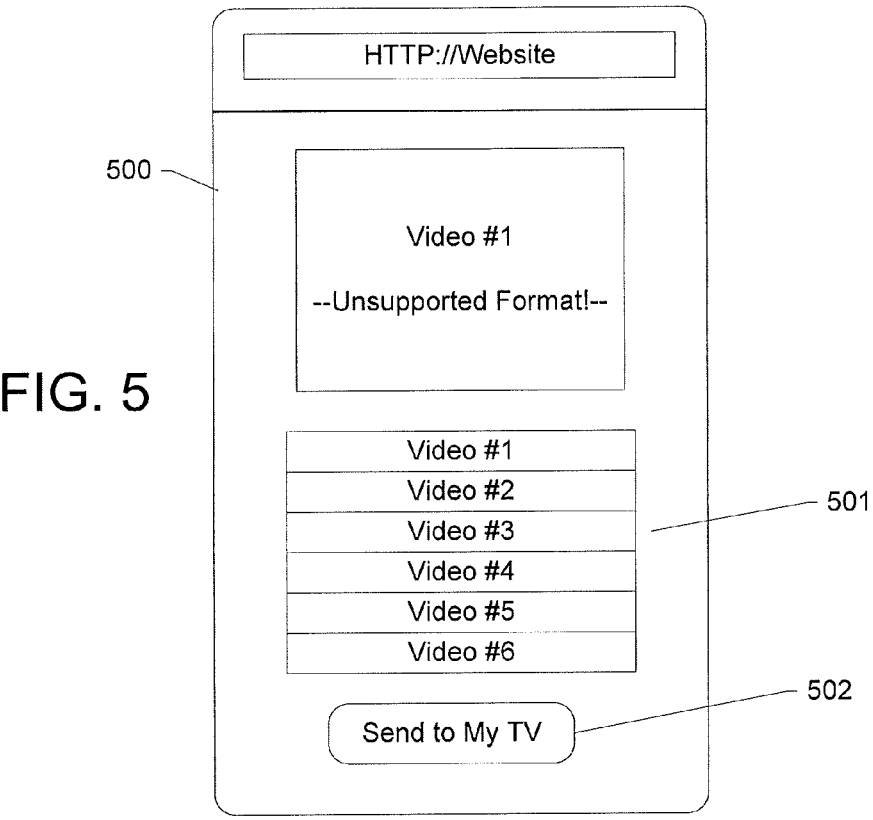

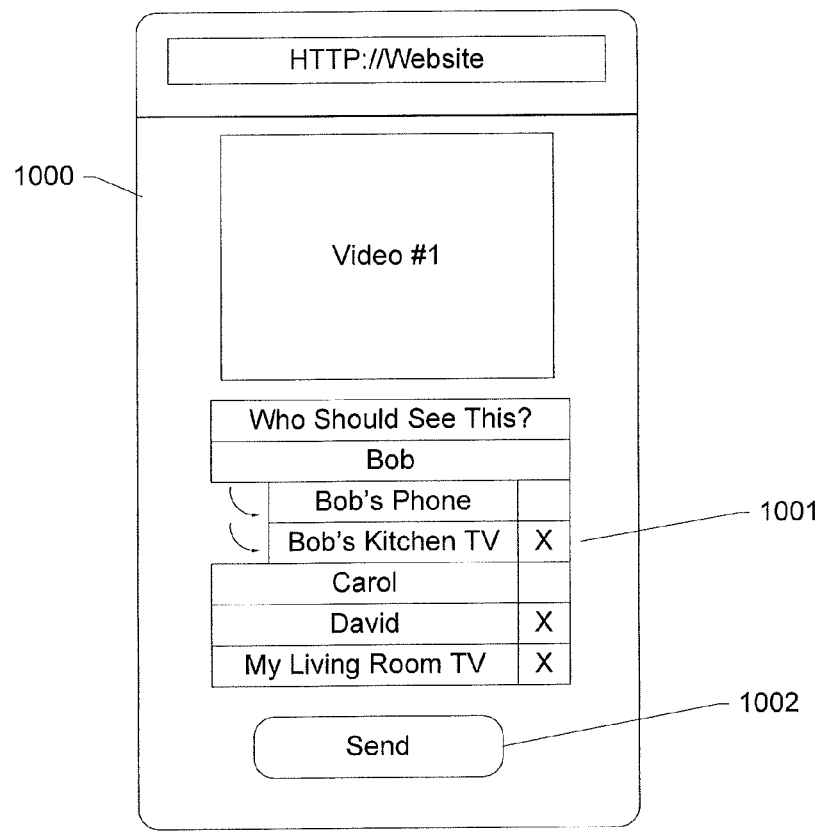

MEDIA CONTENT REDIRECTION

CROSS REFERENCE TO RELATED APPLICATIONS

The present application claims priority to, and is a continuation of, U.S. patent application Ser. No. 13/542,187, filed Jul. 5, 2012, and entitled "Media Content Redirection," which is hereby incorporated by reference.

BACKGROUND

With the advent of digitial distribution of content, such as streaming media sites, there is a growing universe of media that users want to access. There is also a growing universe of ways in which users want to access that content. Users today have access to smart phones, tablet computing devices, video game consoles, Internet-ready televisions, and a plethora of other electronic devices on which they may wish to access media content such as video programs, music, and the like.

Accordingly, there remains an ever-present need to offer users convenience in their viewing options, and an ever-present need to have disparate sources of content accessible by common devices.

SUMMARY

Features described herein relate generally to allowing users to browse networks, such as the Internet, on a first computing device, and then have some of that network content automatically (or otherwise) forwarded to another device (e.g., their home or cloud DVR) for storage or consumption on a second device (e.g., a DVR, or another associated video display). As part of that forwarding, the user's browser may be linked with a content delivery service, with whom the user has an existing account, for example, for on demand viewing of streaming content on a different device. For example, a user may browse the Internet (or another network) at a public library computer terminal, and press a "Send to My TV" button to have a video file added to the user's playlist, such as a home or cloud-based DVR playlist.

In some embodiments, the user's browser can tag a network site's (e.g., an Internet site's) video content offered by a first service (e.g., the operator of the network site), and send resource identification information (e.g., an address) for the tagged content to the content delivery server of a different service (or another device associated with the user's content provider), and the server may then retrieve the content from the network site, transcode the content to a different format, and begin streaming (or otherwise present) the content to the user's secondary device, such as the user's DVR.

In some embodiments, the content server can ingest the requested content from the network site in portions, and transcode the content in portions, to make portions of the content available for streaming before the entire content is available. This may allow users to begin viewing a transcoded stream of network content (e.g., Internet content) before the content server has completed transcoding the content in its entirety.

In some embodiments, a user may skip past portions of the content during playback, and the content server may skip over those portions to transcode the portions that the user actually requests to view or consume. When the playback is ended, the content server may examine its output file, and identify gaps in the transcoding that were due to the user's skipping, and the content server can proceed to transcode those gaps and patch the gaps.

In some embodiments, a user's redirected network content can be presented as an option along with the user's other listings of content from the content server. For example, a client interface, such as an electronic program guide (EPG) listing, may include an entry for redirected network content; or redirected content can appear in a listing of available videos on demand This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5 illustrates an example browser interface.

FIGS. 6-7 illustrate example user interfaces that can be used to access redirected media content.

FIG. 10 illustrates an example user interface employing features described herein.

DETAILED DESCRIPTION

Figure 1:
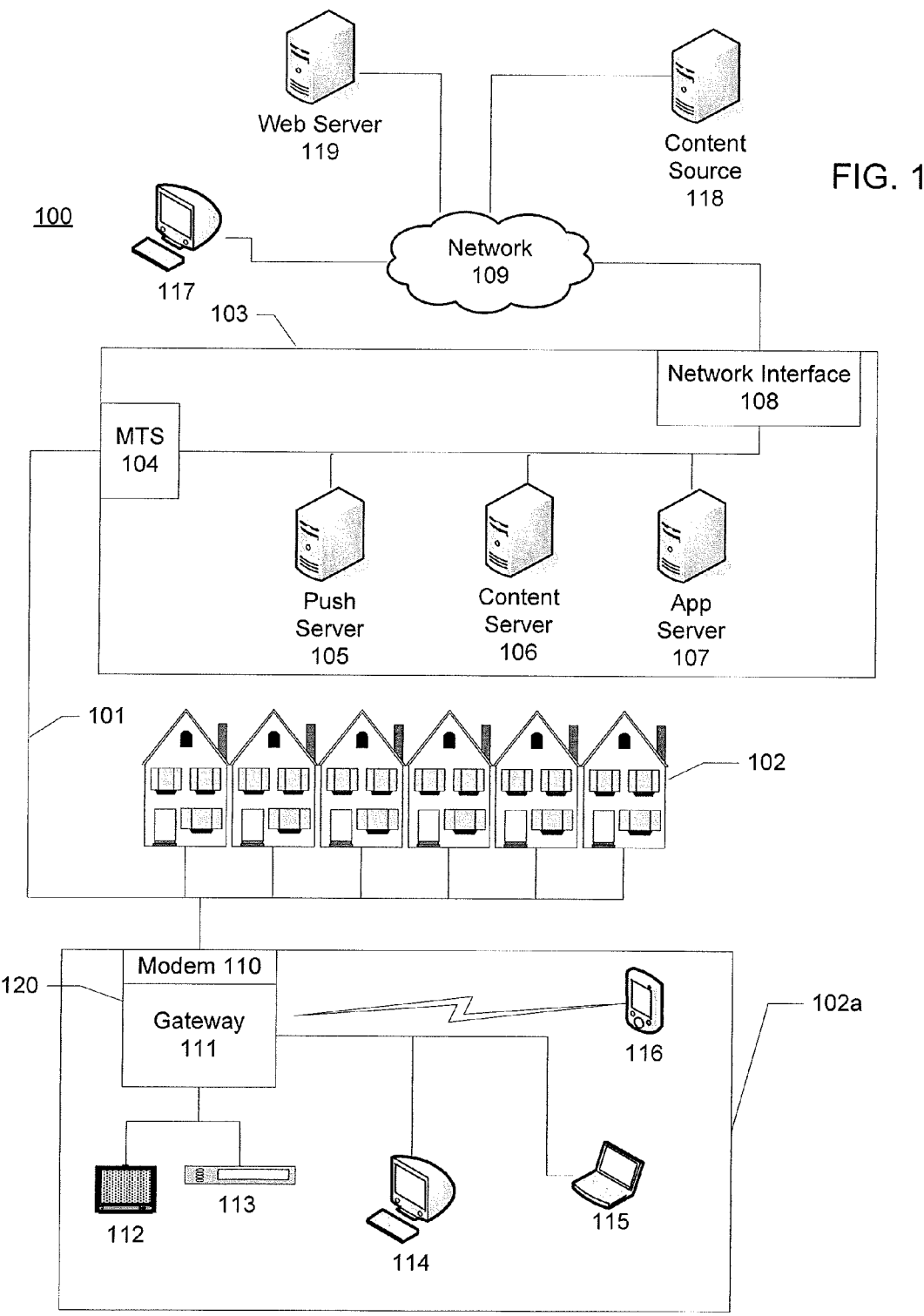
FIG. 1 illustrates an example network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication links 101 (e.g., coaxial cables, optical fibers, wireless, etc.) to connect multiple homes 102 to a local office 103 (e.g., local cache server, central office, headend, etc.). The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. The link 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a modem termination system (MTS), which may be a computing device configured to manage communications between devices on the network of links 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include an interface 120. The interface 120, in one embodiment, may have a device 110 (e.g., modem, optical coupler, wireless antenna, etc.), which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. The system may also include one or more external computing devices 117, content sources 118 (e.g., sources of video files, audio files, audiovideo files, and the like), and web servers 119 (e.g., a host of an Internet site that offers access to Internet content, such as the content stored at the content source 118).

Figure 2:
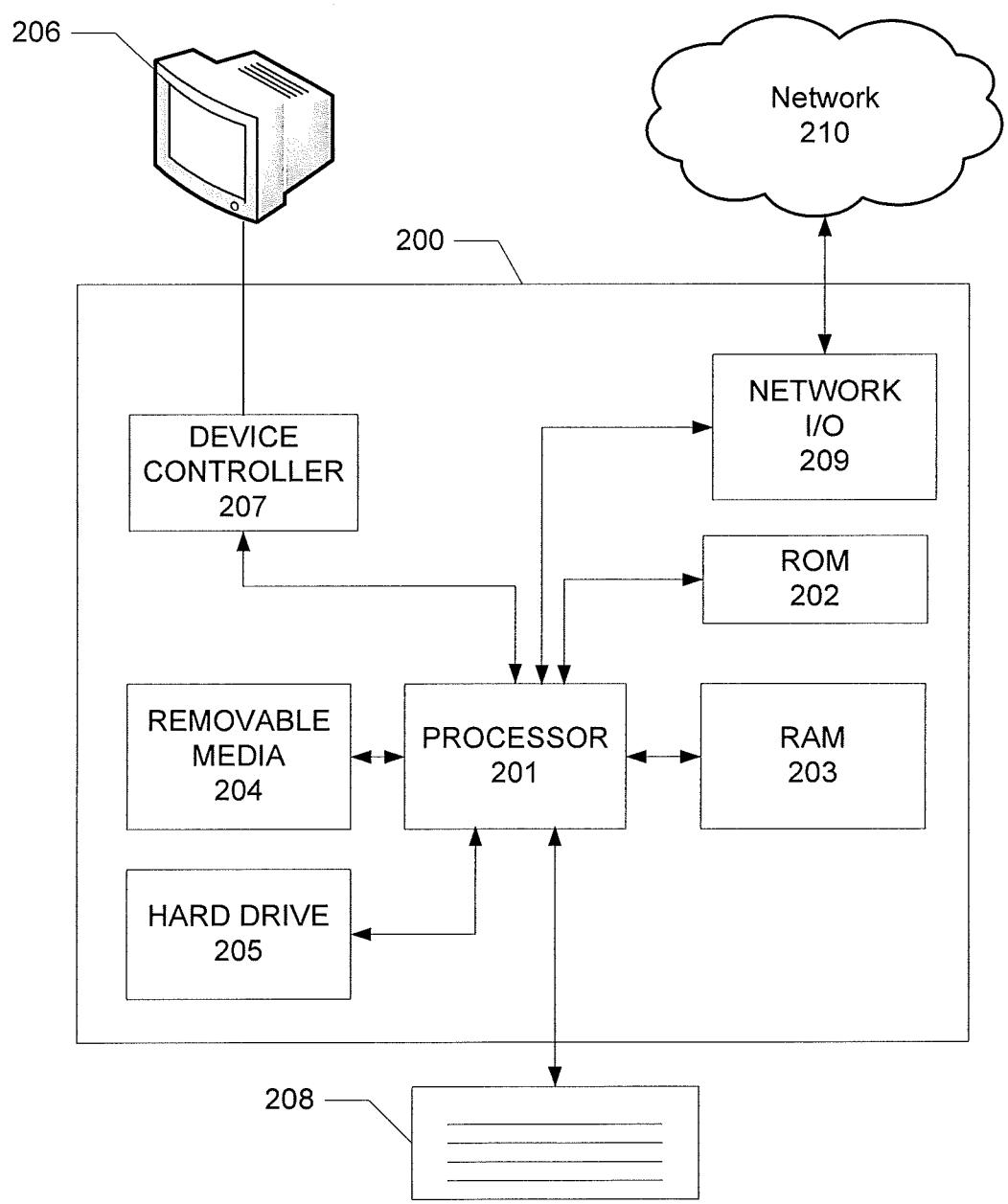
FIG. 2 illustrates an example hardware and software platform on which various elements described herein can be implemented.

FIG. 2 illustrates general hardware (some or all of which may be implemented in software) elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
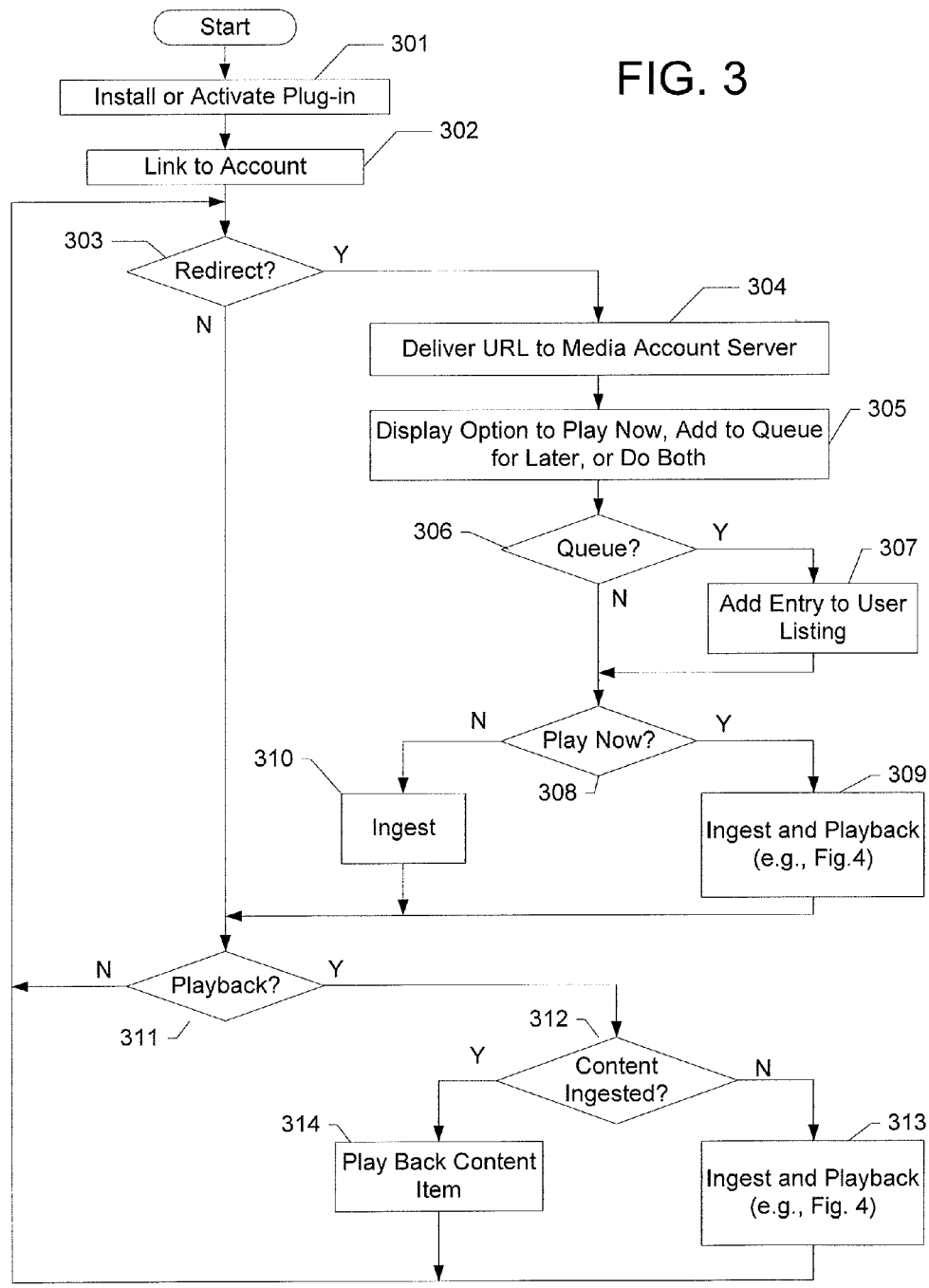
FIG. 3 illustrates an example process flow embodying features described herein.

FIG. 3 illustrates an example process embodying some of the various concepts described herein. The individual steps may be performed by a computing device, such as a content server 106, user device 114, or any other desired device. The examples discussed below are merely examples, and the devices and servers can be implemented on any desired network computing device. In step 301, the process can optionally begin with the installation of a plug-in software module to a network browser, such as INTERNET EXPLORER™ by Microsoft, or a local network browser. The plug-in may be an application or additional software to the browser, or it can be built-in and included with the browser's functionality. The plug-in may include instructions that can identify a resource address (e.g., a uniform resource identifier, locator, etc.) for a content server (e.g., content server 106 or 118, with content server 106 as the example below), and instructions to allow a user of the browser to log in to an account that the user has with the content server, and to authorize the browser (or the computing device executing the browser, such as a PC 117) for interaction with the content server, or vice versa, as discussed below.

In step 302, the user may initiate the plug-in, or otherwise initiate an instruction or message to request to link the browser (or computing device 117 running the browser) to the user's account with a network computing device, such as the content server 106. In response to the request, the browser (via computing device 117 in the example herein) may transmit a request to the content server 106, identifying the browser (e.g., name and version of program), computing device 117 on which the browser is executing (e.g., media access control (MAC) address, serial number, assigned Internet Protocol address, etc.), and the user (e.g., name, account number or name on the content server, password, etc.). In response, the content server 106 can verify that the user's name and password are correct, and identify an account of the user at the content server 106. The user's account can be, for example, a subscription service for data services, such as reception of audiovisual content.

As a result of the linking (or the installation of the plug-in), the user's browser may offer a command function, such as via display of an added redirection command graphical button, to allow a user to send a piece of identified network content to the user's own secondary device, such as a home gateway, display device, smart phone, modem, set-top box, digital video recorder, or other computing device that the user prefers to use with the content server 106 to receive content. As the user browses through various network content (e.g., Internet sites and web pages) offered by various different services (e.g., the various owners of different browsed web pages), the plug-in can scan the content available on a page being viewed, and identify media content that can be redirected to the user's secondary device. For example, the plug-in can detect the presence of embedded video links in a web page, or the presence of audio files available for download, by comparing file name extensions in the HTML (hypertext markup language) with extensions for video and/or audio formats, such as *.mpg or *.mp3. Redirectable media content can include video, audio, and/or audiovisual content that can be played back on a secondary device such as a video on demand client device.

If such media content is available on a site being displayed, the user can select the added redirection command (e.g., by pressing a "Send to My DVR" graphical button on the browser's command interface) to redirect a selected video from the site to the user's secondary device, via a different service associated with that secondary device (e.g., if the secondary device is a DVR, then the company offering the DVR service to the user). FIG. 5 illustrates an example display 500 that can include a listing of one or more pieces of video content 501, and a "Send to My TV" button 502.

In step 303, the browser can determine whether the user has selected the redirection command If the user has, then in step 304, the browser may collect information regarding the media content that is to be redirected, and can deliver that information to the content server 106 using, for example, a user datagram protocol (UDP) message. The collected information can include, for example, information identifying the piece of media content. Such media content identification can be in any format or protocol, such as a uniform resource identifier (URI) or locator (URL) indicating an address at which the media content can be accessed. The collected information can also include information identifying the user, such as a user name or account number, and an associated password that is valid for the user's account with the content server 106.

In step 305, the user's secondary device (e.g., the user's display device or DVR 113) can receive a message from the content server 106 indicating that the network source's (e.g., an Internet site's) media content has been (or can be) redirected to the secondary device, and can display a message (e.g., a pop-up message) to the user asking how the user would like to handle the redirected content. Displayed options can include, for example, adding the redirected content to a user-specific or device-specific playlist or queue (e.g., adding it to a user's favorites list, or to a listing of recorded DVR content, or to a listing of available video on demand (VOD) content, etc.), beginning playback immediately, or both. This message can be displayed substantially immediately after the user selected the redirection command on the browser, and can appear even before the content server 106 has ingested the redirected media content.

In step 306, a network computing device, such as the content server 106 (or the secondary device, such as DVR 113) can determine whether the user selected to add the redirected network (e.g., Internet) media content to any type of a playlist or queue. If the user chose to do so, then in response to the user selection, the secondary device can add an entry to a stored table identifying the redirected content. This can involve, for example, adding an entry for the redirected content to the user's list of redirected Internet content. Such a list can be displayed along with any network or user-defined list, such as a listing of recorded DVR content, and/or a list of VOD content that is available for purchase and/or on-demand consumption. The entry can appear in other lists as well. For example, the redirected Internet content can appear in a content interface, such as an electronic program guide (EPG) grid listing of upcoming scheduled video programs. Such an EPG listing may list entries for a plurality of video services (e.g., television stations, channels, networks, etc.), and the redirected network (e.g., Internet) content can appear as its own service in the listing. FIG. 6 illustrates an example EPG 600, with an entry 601 for the redirected Internet content channel. As illustrated, the listing can identify the duration of the redirected content, allowing the user to gauge his/her viewing to coincide with other scheduled content. So, for example, the user viewing the FIG. 6 example can see that if he/she were to watch the redirected videos A-H, the last video H would end at 9 pm, in time to watch the beginning of a Comedy that starts at 9 pm on ABC.

FIG. 7 illustrates another option playlist that can be used to present the redirected content to the user. In FIG. 7, the redirected Internet content is listed along with other content (e.g., VOD content or other available content items) that is available for on demand viewing and/or purchase.

In step 308, the content server 106 or secondary device 113 can determine whether the user requested to begin playback of the redirected content immediately (or within a predetermined time, such as 5 seconds). For example, the user could be browsing the Internet on a smart phone while watching a video program, and can decide that he/she would like to view a particular Internet video clip on his/her television instead of the phone. The user can select the play now option in step 308.

If the user chose to watch the program immediately on the secondary device, then the device 113 can inform the content server 106, and the content server 106 can proceed to step 309 and initiate a chunk-based ingest and playback process, for example, discussed further below with regard to FIG. 4, to initiate the video stream and/or otherwise begin the ingest process of retrieving and transcoding the content from the Internet source to add the video the content server 106's service. Other types of ingest and transmission may be implemented as desired, such as any type of file-based or streaming transmission.

If the user did not choose to watch the program immediately, or within a predefined time frame (e.g., 5 seconds), then in step 310, the content server 106 can conduct an ingestion process. This ingestion process can involve, for example, using the resource address to request the media content, comparing the format of the content to determine if the format is playable by the user's secondary device 113 (or all of the user's devices), and transcoding the media content if any of the user's secondary devices cannot use the media content's current format. Multiple types of transcoding can be conducted, and one or more output files may be generated to store the transcoded media content in different formats that are supported by the user's secondary devices.

Returning to step 303, if the user did not choose to redirect a piece of content, then in step 311, the user's secondary device 113 can determine whether the user has requested to playback a piece of content that was previously redirected. This can be done, for example, by selecting the content from the displays shown in FIG. 6 or 7.

If the user has chosen to play back redirected content, then in step 312, the content server 106 can determine whether the redirected content has been completely ingested and processed into a format that is ready for playback on the user's playback device. For example, if the user requested playback from a DVR 113, then the content server 106 can check to determine whether the ingestion of the redirected content has generated a complete file that can be used to stream the content to the DVR 113 (even if the content is still being ingested for other formats besides the DVR 113).

If the content has not yet been completely ingested in a format duitable for the user's requested playback device, then in step 313, the content server 106 can conduct the chunk-based ingest and playback routine mentioned above, and discussed further below with regard to FIG. 4. On the other hand, if ingestion has been completed for the format needed by the requesting playback device, the content server 106 can proceed to step 314, and initiate a stream (or other transmission type as applicable or desired) to play back the requested content and transmit it in a stream to the user's playback device. The process can then return to step 303 for further redirection and playback options.

Figure 4:
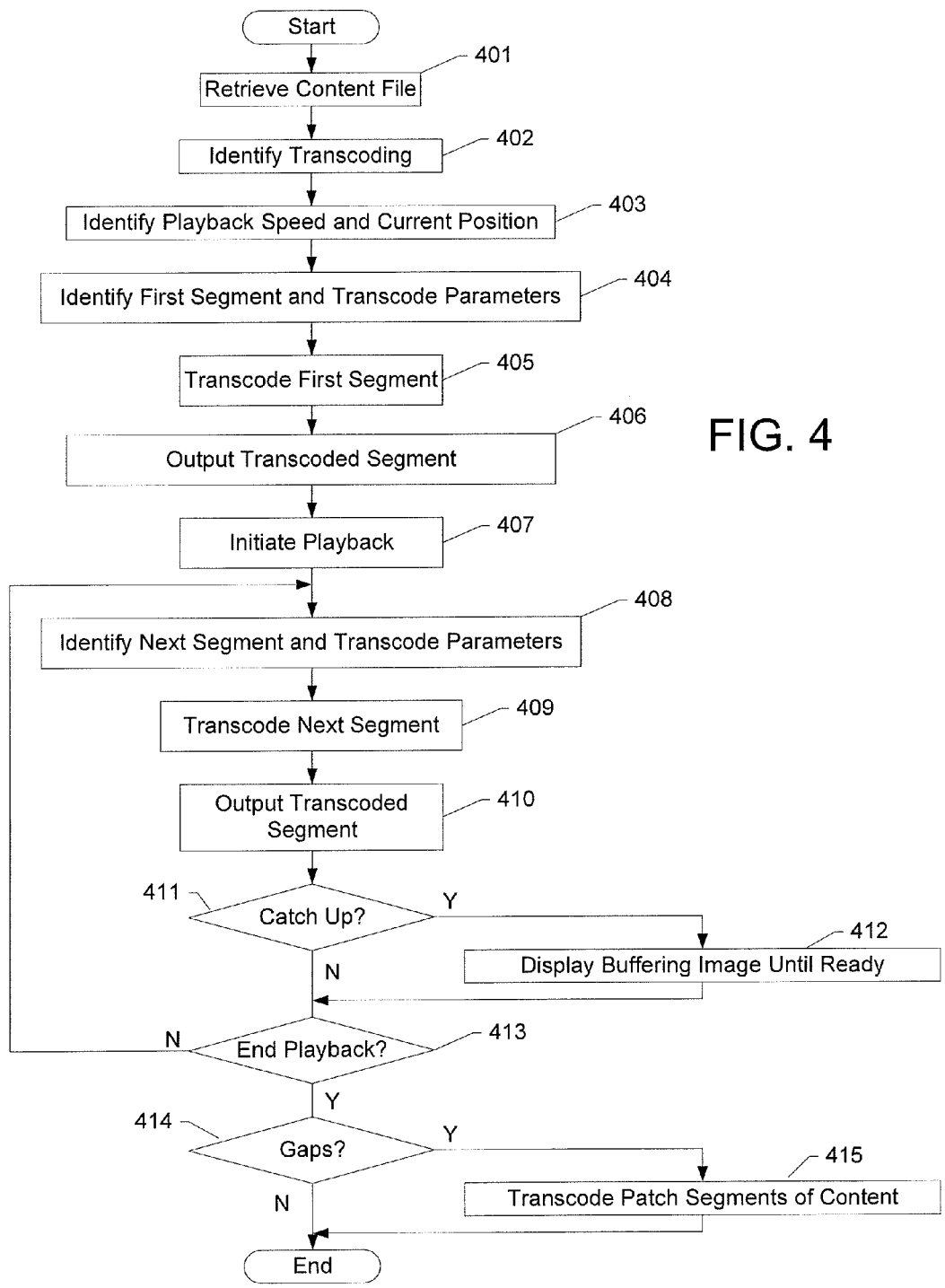
FIG. 4 illustrates an example process flow for an ingestion process.

FIG. 4 illustrates an example process by which the content server 106 can conduct a chunk-based ingest, transcoding and playback procedure for a piece of redirected content that is requested for redirecting and/or playback. In step 401, the server (again, this is an example, and the referenced computing devices may be any desired network computing device) may retrieve the redirected content from a network source, such as from an Internet source. For example, the content server 106 may transmit an HTTP GET request to the URL of the server 119 that is hosting the content that is to be redirected. The network device, such as server 119, can respond by delivering the file (or stream, or in any other desired manner of delivery) containing the requested media content.

In step 402, the content server 106 can examine the format of the retrieved, e.g. downloaded, redirected media content, and determine the amount of transcoding, if any, that will be needed to support the redirected content. This determination can be based on a variety of factors. For example, the content streaming hardware and software of the content server 106 may be configured to stream input of a certain predetermined format, and if the downloaded media content is not in that format, then it may be necessary to transcode the media content to be in that format. Additionally, if multiple different sets of hardware and/or software are used for the streaming (e.g., if streaming services are offered to support user devices having different capabilities), the content server 106 may determine that a plurality of transcoding processes will need to be performed on the media content, to generate a plurality of different output file formats to support streaming to the user's devices.

In step 403, the content server 106 can determine the user's requested playback speed and current position in the content. For example, the user may have requested playback to begin at the 0:30 mark in a redirected Internet video (e.g. if the user has already consumed the first 30 minutes of the content on another device), and to view the video at one-half speed. These parameters may be contained in the playback request, and in step 403 the content server can identify those parameters for use in step 404. In step 404, the content server may identify a location in the media content file at which the playback is to begin, and in turn, identify a segment of the media content containing that playback beginning point to be the first segment to be transcoded and ingested. The segment may be time-based (e.g., the first 10 seconds), size-based (e.g., the first 500 Kb), frame-based (e.g., the first 10 I-frames of an MPEG2 video file), or any other desired segmentation or compression format that is supported by the transcoding software/hardware available. The content server 106 can also establish transcoding parameters, based on the requested playback speed (e.g., a one-half speed slow motion playback may result in a different type of output file and/or different type of output stream from an ordinary full-speed transcoding).

In step 405, the content server 106 can transcode the first portion (e.g., a segment, fragment, chunk, etc.) of the media content item. The transcoding can entail reading the original media content file data for the first segment, decoding it to generate the content (e.g., video), and then re-encoding the content using a different encoder from what was originally used to encode the content, to result in a differently-encoded segment of the media. For example, an original Internet video may be in a first video coding format (e.g., Adobe FLASH™), and the different encoding may result in a second video coding format (e.g., MPEG-2). This transcoding can be a hybrid between a "file-based" transcoding approach and a "streaming" transcoding approach. In particular, the transcoding can process segments faster than real time, but could also give access to the output file before the transcoding of the entire media content is completed.

In step 406, the transcoded segment of the media content may be written to an output file at any desired location, such as the content server 106's memory (e.g., a hard drive 205). In step 407, the content server 106 can transmit the content to a local storage or initiate playback of the requested content. For example, the network device may transmit the file containing the first segment to the streaming hardware/software used by the content server 106 to service video on demand streaming requests.

In step 408, the content server 106 can proceed to identify the next segment and its corresponding transcode parameters. The next segment can be sequentially identified as following the first segment identified in step 404, or it can be a different segment if, for example, the user has requested to skip ahead to a different portion of the program (e.g., pressing fast-forward, or skipping to a later chapter in a video file). When the user requests to skip ahead in the content, the server 106 may similar skip ahead and omit delivering and/or transcoding the skipped portions. As will be discussed further below, such skipped over portions can be subsequently transmitted and transcoded.

In step 409, the content server 106 can transcode the next segment of the media content obtained from the source (e.g., an Internet source 119). This transcoding can be done in much the same was as it was in step 405, but with parameters changed as needed.

In step 410, the content server 106 may write the re-encoded version of the segment to an output file. The output file may be a different one from the previous segment, or it can write the new segment to the same output file as the previous segment. The choice depends on whether the streaming software/hardware of the content server 106 is able to support dynamically changing source files for a live stream.

In step 411, the content server 106 can determine whether the playback of the redirected content has reached the end of the available transcoded segments, such that no additional transcoded segments are currently available. This can occur, for example, if there is a delay in the transcoding processor, or if the media content is only retrieved piecemeal from the source 119, and the current playback has finished playing back the portions that have been retrieved thus far. If the playback has caught up to the transcoding and ingestion, then the content server 106 can proceed to step 412, and continue inserting video (or other content) into the stream that is carrying the content for the user. Maintaining the stream (as opposed to terminating it) can allow for faster playback recovery when the next segment of the content is available, since reservations of resources do not need to be repeated.

The additional content added in step 412 can be any desired content to fill the time. In some embodiments, the inserted content can be a static video image of the last frame that was streamed to the user. In some embodiments, this last frame can be overlaid by an animation of an hourglass or other animated icon to illustrate that the video is paused because some additional processing is needed in the background.

In step 413, the content server 106 can determine whether the user has requested termination of the playback of the content (e.g., by pressing a STOP button, or turning off the secondary device). If the user has not requested to stop the playback, the server can return to step 408 to identify and transcode the next segment of the media content.

If the user has chosen to stop the playback, then in step 414, the content server 106 can determine whether there are any gaps in the transcoded version or files of the media content. Gaps can occur, for example, when the user skips over portions of the media content during the playback, such that one or more portions or segments of the original media content do not get transcoded and ingested by the content server 106. The content server 106 can identify gaps by, for example, comparing playback time codes of the segments encoded and identifying time regions that are unaccounted for. Or, in a simpler manner, the content server 106 can simply store information identifying each playback time (e.g., time relative to the start of a piece of redirected content) when a user begins to fast forward or skip through the content, and when the user resumes normal playback. The playback time in between these values can then be added to a register or data structure as gap portions of the content that will need to undergo the normal playback speed transcoding at a later time.

If there are such gaps, then in step 415, the content server 106 can proceed to transcode patch segments of the media content to fill the gaps. For example, if the user had skipped from 0:15 to 0:25 of the content during playback, and that 10-second portion did not get transcoded during the chunk transcoding and playback, then in step 415 that portion can be transcoded to patch the content server 106's files so that the content server 106 contains a full version of the transcoded content. Accordingly, should the user access the same content a second time, the user might not be required to view the hourglass animation that was attributable to ingestion delays, as described above.

Figure 8:
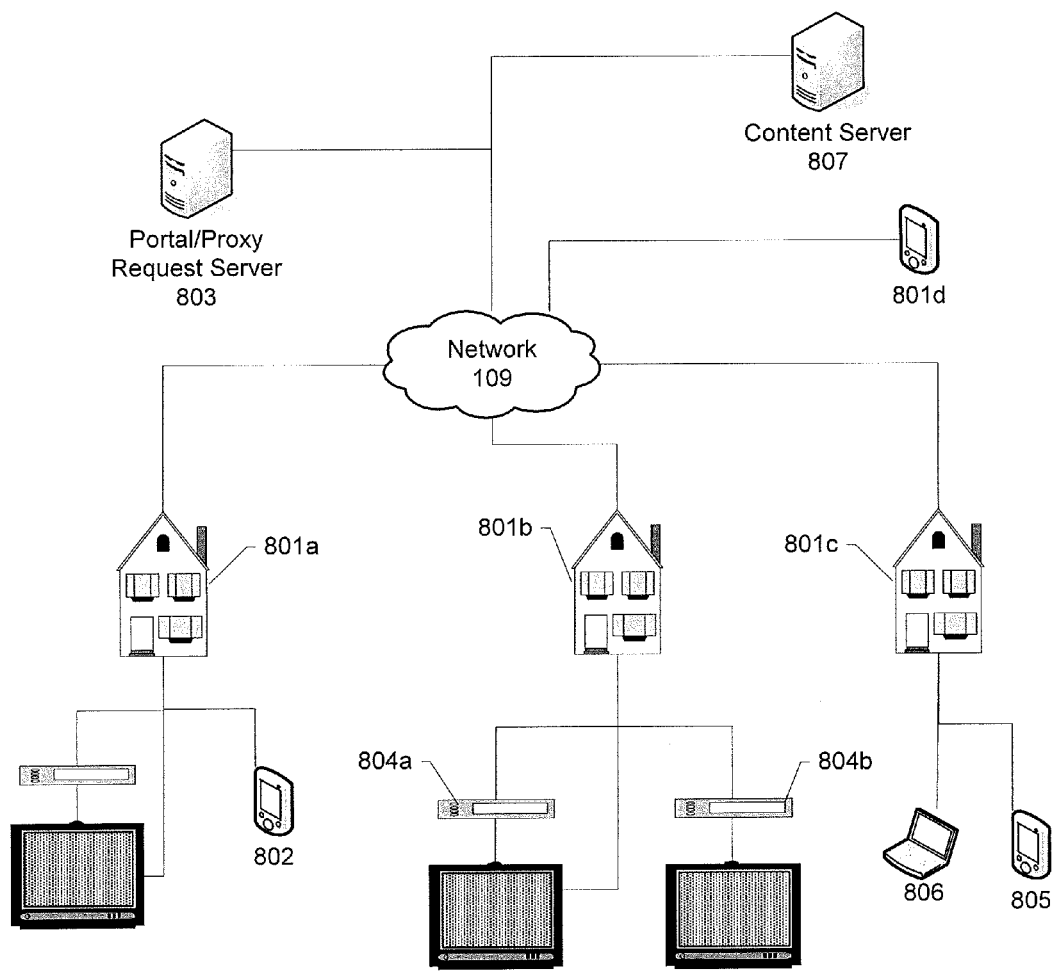
FIG. 8 illustrates an example network on which various elements described herein can be implemented.

In some embodiments, a user may share Internet (or other network) content with friends in a social network. FIG. 8 illustrates an alternative view of the system in FIG. 1, but with an emphasis on the multiple households and locations 801a-d. In the example discussed below, a user in household 801a may be browsing Internet content using a smartphone 802, but may wish to redirect that content to devices in his/her friends' premises, households, or mobile points 801b,c,d. For simplicity, the local office 103 is not illustrated in FIG. 8, and may instead be considered a part of network 109. FIG. 8 also illustrates direct connections between the gateway (within the home) and some display devices, bypassing the set-top boxes. This is just to illustrate that functionality may be rearranged as desired, and the necessary network communication functionality can be built into the display device (e.g., a television), obviating the need for a separate set-top box.

Figure 9:
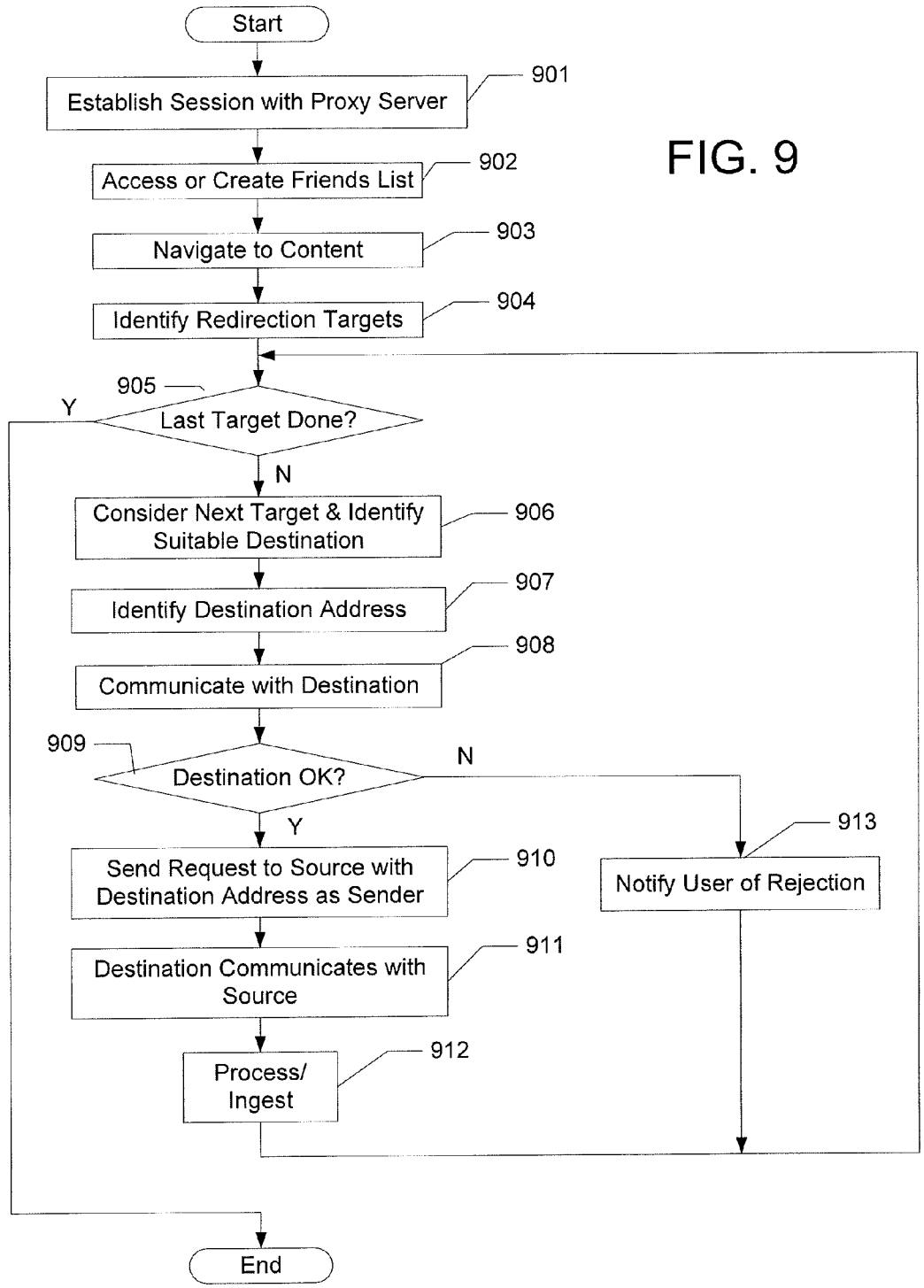
FIG. 9 illustrates an example process flow for social content redirection of content.

FIG. 9 illustrates an example method of sharing. In step 901, the user may initially use smartphone 802 to log in to a portal/proxy request server 803. This may be done, for example, by having the smartphone 802 navigate to an Internet address of the portal/proxy request server 803, and by having the user supply a predetermined username and password to authenticate the user's session with the server 803. Although a smartphone 802 is used as an example here, the user can alternatively use any desired type of computing device. For example, a personal computer running a remote desktop application, or a tablet, can log into the proxy server as well.

Once the session is established, the user can then create or access an available friends list in step 902. Creating the friends list can be accomplished in a variety of ways. For example, the user can manually type in identification information of friends who also have registered with the server 803. This identification information can include, for example, user names or handles of the friends. When the user adds a friend to his/her friend list, the server 803 may transmit a message to the identified friend, requesting confirmation that the user is indeed a friend. If the friend confirms, then the server 803 may obtain additional information regarding the friend. In particular, the server 803 may obtain information identifying the content consumption devices used by the friend. This information can include, for example, address information (e.g., MAC address, IP address, phone number, etc.) identifying the various set-topboxes 804*a,b* that a friend may have, and/or the other smartphones 805 and personal computers 806 that the friend may have. The device identification information can also identify device capabilities, such as screen resolution, sound channels, speaker types, connection speed or type, etc. All of this information may be stored at the server 803 as part of the user's friend list information.

In step 903, the user may use a server 803 interface to navigate to content. For example, the server 803 may offer a browser interface or remote desktop window that the user can use to enter website addresses, conduct searches, and generally navigate through Internet content. The content can be any desired content such as the videos discussed above, and may be offered by a content server 807. In some embodiments, the content may be user-uploaded content. For example, the user may capture a video using a camera on the smartphone 802, and upload it to the content server 807. Upon uploading, the server 807 may conduct one or more transcoding processes on the content to generate versions of the video that can be played by a variety of devices, and can also generate a uniform resource locator (URL) that can be used to access the content. Such content can be stored on the content server 807 for a predetermined amount of time, such as 20 minutes, and may be automatically deleted afterwards to conserve storage.

In step 904, the user may select to redirect the content. To do so, the user may be prompted by the server 803 (and via the smartphone 802) to identify one or more targets for redirecting the content. FIG. 10 illustrates an example user interface 1000 in which the user is given options 1001 to select one or more friends for sending. In some embodiments, the user may expand a listed friend (e.g., by clicking or tapping on the name) and see an expanded listing of the various devices that the particular friend has registered with the service. Note that the options may also include other devices associated with the redirecting user him/herself, such as a television in the living room. To support such a feature, the server 803 may store device information for the user similar to the device information stored with the friends list. In some embodiments, this redirection request can be part of the user's smartphone 802 initially requesting the content. For example, the user's smartphone 802 may initiate an IP request for a particular Internet page, and the server 803 may split that request into multiple requests: one for the smartphone 802 and one or more others for friends, as will be discussed below.

In step 905, the server 803 may begin a looping process for each identified target. In step 906, the server 803 may determine the ultimate destination device for the next selected target. For example, if the user chose a friend "Bob" who lives at house 801*b*, the server 803 may identify the various devices 804*a,b* that are associated with Bob, and then determine which of Bob's devices 804*a,b* should receive the redirected content. This determination may be made using a variety of pieces of information. For example, the determination can be made based on usage status of the devices. If Bob is currently watching television on set-top box 804*a*, and set-top box 804*b* is turned off, then ther server 803 may determine that set-top box 804*a* should be the appropriate destination for this redirection. The determination can be made based on the redirected content. For example, if the redirected content is a high-definition (HD) piece of video, and only one of Bob's televisions is HD (e.g., the one serviced by set-top box 804*a*), then the server 803 may determine that set-top box 804*a* should be the appropriate destination.

The destination can also be based on the friend's predefined user preferences. For example, Bob may have indicated in his profile on server 803 that redirected content should only be redirected to set-top box 804*a*. Bob can even establish different conditions for using the different devices, such as setting times of day for when redirected content should be directed to which devices, friends for which different preferences should be used, content types that should be redirected to (or restricted from) certain devices (e.g., R-rated content should only be redirected to my phone, and not the home television), etc. Those preferences can be implemented when generating the FIG. 10 list, such that registered devices can be filtered based on the friends' preferences. For example, if Bob's preference is to not use his Living Room set top box for redirected content from his friend Alex, then when his friend Alex requests to redirect content and sees the FIG. 10 display, the display can omit an entry for Bob's Living Room device, such as a set-top box. In some embodiments, the list of preferences can be absolute and prohibitive, such as the example above in which Bob's Living Room set-top box simply does not appear in the redirecting user's list of FIG. 10 options. In other embodiments, the preferences may be suggestive, and a short tag or popup may be displayed to inform the recommending user of the suggestive preferences. For example, the FIG. 10 listing for Bob's Phone may include the message "Bob has asked that large video files not be redirected to the phone," but the redirecting user may nevertheless choose that option if, for example, the redirecting user really only wants the redirected content to appear on the phone.

In step 907, the server 803 may identify the address information for the selected destination device, such as the device's MAC or IP address. The server 803 may also identify other device information, such as the capabilities information discussed above.

In step 908, the server 803 may transmit a message to the destination device, identifying the user and the redirected content. The content may be identified with a URL, or it may simply be identified with its basic characteristics (e.g., video type, duration, genre, dimensions, etc.).

In step 909, the server 803 may determine whether the destination (or the friend) wishes to actually receive the redirected content. As noted above, the friend may receive a pop-up message identifying the redirected content, and may be given the option to view the content immediately, to store the content for later viewing, or to ignore it altogether.

If the user chooses to accept the content, then in step 910, the server 803 may proceed with sending a request for the content on the destination's behalf. Instead of identifying the proxy server 803 as the sender of the request, the server 803 may insert the destination device's address or identifier instead. The server 803 may also insert in the request any additional criteria that would be used by the content source in delivering the redirected content. For example, if the content source 807 desires to know the device's display characteristics, software versions, applications running, etc., then the server 803 can provide that information as well. To the extent that the content source 807 initially requests this information in response to a content request, the server 803's initial message to the content source may properly identify the server 803, and not the target destination, as the sender of the request, so that further inquiries from the content source can be properly directed to the server 803.

Alternatively, the server's 803 initial request can still identify the target destination as the sender of the request, and further communications may be conducted directly between the content source 807 and the target destination (e.g., set-top box 804*a*).

In some embodiments, the server 803 may act as a bridge, and may perform network address translation (NAT) to handle communications between the content source 807 and the destination. Additionally, if the destination (e.g., set-top box 804*a*) does not have its own IP addressing capability, then a corresponding switched digital video server may handle communications on behalf of the destination, and the address of that switched digital video server may serve as the address of the destination in the discussion above.

In step 911, the content source 807 may then communicate with the destination device to establish a session for providing the redirected content (e.g., communications to establish/determine the CODEC, compression, encryption, etc. for the content), and from there the content may be delivered, transcoded and otherwise processed 912 or ingested similar to that discussed above with regard to FIGS. 3 and/or 4.

If the destination declines to accept the redirected content, then in step 913 the original user may be notified of this (e.g., via a return message), and the server 803 may proceed to the next friend.

In some embodiments, this message may be a remote tune command, instructing the remote destination device to tune to a different source, or to prepare to receive redirected content. Such a command may be acceptable, for example, if the user were redirecting the content to his/her own television set-top box. The user may have configured the set-top box to automatically accept remote tuning commands from the server 803. In such a situation, the option of step 909 may be obviated, and the content may automatically be redirected. In such embodiments, the destination set-top box may be a digital video recorder that is configured to automatically receive and store the redirected content, and to display a prompt offering to play the content to the user.

It should be noted that the redirection of the uploaded content can include the various transcoding and redirection features described above, for example with respect to FIGS. 3-9.

The various features described above are merely nonlimiting examples, and can be rearranged, combined, subdivided, omitted, and/or altered in any desired manner For example, the method steps illustrated are merely examples, and the steps may be rearranged, combined and/or omitted as desired, and additional steps may be inserted as well. The true scope of this patent should only be defined by the claims that follow.

We claim:

1. A method comprising:
receiving, by a computing device and from a first device, a first request to direct multimedia content to a second device, wherein the first request comprises a resource address associated with the multimedia content;
in response to determining that a second request for the multimedia content at the second device was received within a threshold amount of time after the first request:
initiating retrieval, by the computing device and from the resource address, of a subset of segments of the multimedia content;
receiving, by the computing device, the subset of segments of the multimedia content;
transcoding, by the computing device and based on characteristics of the second device, the subset of segments of the multimedia content; and
sending, to the second device and before receiving and transcoding an entirety of the multimedia content, the subset of segments of the multimedia content.

2. The method of claim 1, further comprising:
receiving, by the computing device and from the first device, a third request to direct second multimedia content to the second device, wherein the third request comprises a second resource address associated with the second multimedia content; and
in response to determining that a fourth request for the second multimedia content at the second device was not received within the threshold amount of time after the third request, initiating retrieval, by the computing device and from the second resource address, of an entirety of the second multimedia content.

3. The method of claim 2, further comprising:
receiving, from the second device and after expiration of the threshold amount of time after the third request, the fourth request;
determining, by the computing device and responsive to the fourth request, that the entirety of the second multimedia content is received and transcoded; and
sending, by the computing device and to the second device, the entirety of the second multimedia content.

4. The method of claim 2, further comprising:
receiving, from the second device and after expiration of the threshold amount of time after the third request, the fourth request;
determining, by the computing device and responsive to the fourth request, that the entirety of the second multimedia content is not yet received and transcoded;
determining, by the computing device, that a subset of segments of the second multimedia content is received and transcoded; and
sending, to the second device and before receiving and transcoding the entirety of the second multimedia content, the subset of segments of the second multimedia content.

5. The method of claim 4, further comprising:
initiating retrieval, by the computing device and from the second resource address, of a subset of segments of a remainder of the second multimedia content;
receiving, by the computing device, the subset of segments of the remainder of the second multimedia content;
transcoding, by the computing device and based on characteristics of the second device, the subset of segments of the remainder of the second multimedia content; and
sending, to the second device and before receiving and transcoding an entirety of the remainder of the second multimedia content, the subset of segments of the remainder of the second multimedia content.

6. The method of claim 1, further comprising sending, by the computing device and to the second device, a message prompting for instruction on when to send the multimedia content.

7. The method of claim 1, wherein the initiating retrieval comprises transmitting, to a uniform resource locator (URL) of a source hosting the multimedia content, an HTTP GET request for the multimedia content.

8. The method of claim 1, wherein the resource address comprises one of a uniform resource identifier (URI) or a URL.

9. The method of claim 1, wherein the first device is associated with a first user and the second device is associated with a second user.

10. The method of claim 1, wherein the computing device comprises a server, wherein the first device comprises a computer, and wherein the second device comprises one of a display device, a smart phone, a set top box, or a digital video recorder.

11. A computing device comprising:
one or more processors; and
memory storing instructions that, when executed by the one or more processors, cause the computing device to:
receive, from a first device, a first request to direct multimedia content to a second device, wherein the first request comprises a resource address associated with the multimedia content;
in response to determining that a second request for the multimedia content at the second device was received within a threshold amount of time after the first request:
initiate retrieval, from the resource address, of a subset of segments of the multimedia content;
receive, by the computing device, the subset of segments of the multimedia content;
transcode, based on characteristics of the second device, the subset of segments of the multimedia content; and
send, to the second device and before receiving and transcoding an entirety of the multimedia content, the subset of segments of the multimedia content.

12. The computing device of claim 11, wherein the instructions, when executed by the one or more processors, further cause the computing device to:
receive, from the first device, a third request to direct second multimedia content to the second device, wherein the third request comprises a second resource address associated with the second multimedia content; and
in response to determining that a fourth request for the second multimedia content at the second device was not received within the threshold amount of time after the third request, initiate retrieval, from the second resource address, of an entirety of the second multimedia content.

13. The computing device of claim 12, wherein the instructions, when executed by the one or more processors, further cause the computing device to:
receive, from the second device and after expiration of the threshold amount of time after the third request, the fourth request;
determine, responsive to the fourth request, that the entirety of the second multimedia content is received and transcoded; and
send, to the second device, the entirety of the second multimedia content.

14. The computing device of claim 12, wherein the instructions, when executed by the one or more processors, further cause the computing device to:
receive, from the second device and after expiration of the threshold amount of time after the third request, the fourth request;
determine, responsive to the fourth request, that the entirety of the second multimedia content is not yet received and transcoded;
determine that a subset of segments of the second multimedia content is received and transcoded; and
send, to the second device and before receiving and transcoding the entirety of the second multimedia content, the subset of segments of the second multimedia content.

15. The computing device of claim 14, wherein the instructions, when executed by the one or more processors, further cause the computing device to:
initiate retrieval, from the second resource address, of a subset of segments of a remainder of the second multimedia content;
receive the subset of segments of the remainder of the second multimedia content;
transcode, based on the characteristics of the second device, the subset of segments of the remainder of the second multimedia content; and
send, to the second device and before receiving and transcoding an entirety of the remainder of the second multimedia content, the subset of segments of the remainder of the second multimedia content.

16. A system comprising:
a first device comprising:
one or more processors; and
memory storing first instructions that, when executed by the one or more processors of the first device, cause the first device to:
send, to a computing device, a first request to direct multimedia content to a second device, wherein the first request comprises a resource address associated with the multimedia content;
the second device, wherein the second device comprises:
one or more processors; and
memory storing second instructions that, when executed by the one or more processors of the second device, cause the second device to:
receive, from the computing device, an indication of the multimedia content;
send, to the computing device and within a threshold amount of time after the first request, a second request for the multimedia content;
receive, from the computing device, a subset of segments of the multimedia content; and
the computing device, wherein the computing device comprises:
one or more processors; and
memory storing third instructions that, when executed by the one or more processors of the computing device, cause the computing device to:
receive, from the first device, the first request to direct the multimedia content to the second device;
in response to determining that the second request was received within the threshold amount of time after the first request:
initiate retrieval, from the resource address, of the subset of segments of the multimedia content;
receive, by the computing device, the subset of segments of the multimedia content;
transcode, based on characteristics of the second device, the subset of segments of the multimedia content; and
send, to the second device and before receiving and transcoding an entirety of the multimedia content, the subset of segments of the multimedia content.

17. The system of claim 16, wherein the third instructions, when executed by the one or more processors of the computing device, further cause the computing device to:
receive, from the first device, a third request to direct second multimedia content to the second device, wherein the third request comprises a second resource address associated with the second multimedia content; and in response to determining that a fourth request for the second multimedia content at the second device was not received within the threshold amount of time after the third request, initiate retrieval, from the second resource address, of an entirety of the second multimedia content.

18. The system of claim 17, wherein the third instructions, when executed by the one or more processors of the computing device, further cause the computing device to:

receive, from the second device and after expiration of the threshold amount of time after the third request, the fourth request;

determine, responsive to the fourth request, that the entirety of the second multimedia content is received and transcoded; and send, to the second device, the entirety of the second multimedia content.

19. The system of claim 17, wherein the third instructions, when executed by the one or more processors of the computing device, further cause the computing device to:

receive, from the second device and after expiration of the threshold amount of time after the third request, the fourth request;

determine, responsive to the fourth request, that the entirety of the second multimedia content is not yet received and transcoded;

determine that a subset of segments of the second multimedia content is received and transcoded; and send, to the second device and before receiving and transcoding the entirety of the second multimedia content, the subset of segments of the second multimedia content.

20. The system of claim 19, wherein the third instructions, when executed by the one or more processors of the computing device, further cause the computing device to:

initiate retrieval, from the second resource address, of a subset of segments of a remainder of the second multimedia content;

receive the subset of segments of the remainder of the second multimedia content;

transcode, based on the characteristics of the second device, the subset of segments of the remainder of the second multimedia content; and send, to the second device and before receiving and transcoding an entirety of the remainder of the second multimedia content, the subset of segments of the remainder of the second multimedia content.

* * * * *

UNITED STATES PATENT AND TRADEMARK OFFICE
CERTIFICATE OF CORRECTION

PATENT NO. : 9,900,628 B2
APPLICATION NO. : 15/449380
DATED : February 20, 2018
INVENTOR(S) : Swan et al.

It is certified that error appears in the above-identified patent and that said Letters Patent is hereby corrected as shown below:

On the Title Page

Column 2, Abstract, Line 3:
Please delete "mat" and insert --may--

Column 2, Abstract, Line 6:
Delete "mat" and insert --may--

Column 2, Abstract, Line 7:
Delete "mat" and insert --may--

In the Specification

Column 1, Background, Line 13:
Delete "digitial" and insert --digital--

Column 2, Summary, Line 10:
After "demand", insert --.--

Column 4, Detailed Description, Line 23:
Delete "audiovideo" and insert --audio video--

Column 5, Detailed Description, Line 64:
After "command", insert --.--

Column 7, Detailed Description, Line 34:
Delete "FIG." and insert --FIGS.--

Column 7, Detailed Description, Line 46:
Delete "duitable" and insert --suitable--

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,900,628 B2

Column 11, Detailed Description, Line 59:
Delete "ther" and insert --the--

Column 13, Detailed Description, Line 44:
After "manner", insert --.--